(12) United States Patent
Shimada et al.

(10) Patent No.: US 10,344,172 B2
(45) Date of Patent: Jul. 9, 2019

(54) FLUORINE-CONTAINING COPOLYMER AND SURFACE-MODIFYING AGENT COMPRISING THE SAME AS ACTIVE INGREDIENT

(71) Applicant: UNIMATEC CO., LTD., Tokyo (JP)

(72) Inventors: Kyou Shimada, Ibaraki (JP); Takumi Suzuki, Ibaraki (JP); Yoshiyama Kaneumi, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 1 day.

(21) Appl. No.: 15/549,342

(22) PCT Filed: Jan. 22, 2016

(86) PCT No.: PCT/JP2016/051904
§ 371 (c)(1),
(2) Date: Aug. 7, 2017

(87) PCT Pub. No.: WO2016/129362
PCT Pub. Date: Aug. 18, 2016

(65) Prior Publication Data
US 2018/0022934 A1    Jan. 25, 2018

(30) Foreign Application Priority Data
Feb. 13, 2015    (JP) ................. 2015-026206

(51) Int. Cl.
| | |
|---|---|
| C09D 5/08 | (2006.01) |
| C08F 220/24 | (2006.01) |
| C09K 3/18 | (2006.01) |
| C09D 133/16 | (2006.01) |
| C09D 143/04 | (2006.01) |
| C08F 230/08 | (2006.01) |

(52) U.S. Cl.
CPC .............. *C09D 5/08* (2013.01); *C08F 220/24* (2013.01); *C09D 133/16* (2013.01); *C09D 143/04* (2013.01); *C09K 3/18* (2013.01); *C08F 2230/085* (2013.01)

(58) Field of Classification Search
CPC ................... C08F 220/24; C08F 230/08
See application file for complete search history.

(56) References Cited

U.S. PATENT DOCUMENTS

| | | | |
|---|---|---|---|
| 5,198,503 A | 3/1993 | Numa et al. | |
| 5,298,503 A | 3/1994 | Peglion et al. | |
| 2011/0009555 A1* | 1/2011 | Kurihara | C08F 220/24 |
| | | | 524/544 |
| 2013/0172502 A1 | 4/2013 | Kaneumi | |
| 2014/0171593 A1 | 6/2014 | Sasaki et al. | |
| 2014/0288231 A1 | 9/2014 | Fujita et al. | |
| 2014/0303312 A1* | 10/2014 | Tomko | C08F 220/18 |
| | | | 524/544 |

FOREIGN PATENT DOCUMENTS

| | | |
|---|---|---|
| CN | 103080165 A | 5/2013 |
| CN | 103748126 A | 4/2014 |
| CN | 104039848 A | 9/2014 |
| EP | 0 308 203 | 3/1989 |
| JP | 54-043244 | 4/1979 |
| JP | 64-75502 | 3/1989 |
| JP | 2006-143866 | 6/2006 |
| JP | 2012-41388 A | 3/2012 |
| JP | 2013-091753 | 5/2013 |
| JP | 2015-124232 | 7/2015 |
| WO | WO 2009/034773 A1 | 3/2009 |
| WO | WO 2010/101091 A1 | 9/2010 |
| WO | WO 2012/036036 A1 | 3/2012 |

OTHER PUBLICATIONS

International Search Report from corresponding PCT application No. 2016/051904 dated Mar. 22, 2016 (4 pgs).
International Preliminary Report on Patentability and Written Opinion from corresponding PCT application No. PCT/JP2016/051904 dated Aug. 15, 2017 (6 pgs).

* cited by examiner

*Primary Examiner* — Vu A Nguyen
(74) *Attorney, Agent, or Firm* — Brinks Gilson & Lione

(57) ABSTRACT

A fluorine-containing copolymer that is a copolymer of:
a polyfluoroalkyl alcohol (meth)acrylate represented by the general formula:

$$C_nF_{2n+1}(CH_2CF_2)_a(CF_2CF_2)_b(CH_2CH_2)_cOCOCR=CH_2 \quad [I]$$

(R: a hydrogen atom, a methyl group, n: 1 to 6, a: 1 to 4, b: 1 to 3, and c: 1 to 3); benzyl (meth)acrylate or styrene; and a Si group-containing crosslinkable (meth)acrylate represented by the general formula:

$$CH_2=CRCOO(CH_2)_dSi(OR^1)_eR^2_{3-e} \quad [II]$$

(R: a hydrogen atom, a methyl group, $R^1$, $R^2$: an alkyl group having 1 to 10 carbon atoms, d: 1 to 3, e: 1 to 3). The surface-modifying agent comprising this fluorine-containing copolymer as an active ingredient have an excellent dynamic slip angle after washing with hexadecane, and anti-corrosive properties.

8 Claims, No Drawings

FLUORINE-CONTAINING COPOLYMER AND SURFACE-MODIFYING AGENT COMPRISING THE SAME AS ACTIVE INGREDIENT

RELATED APPLICATION

This application is a 35 U.S.C. § 371 national phase filing of International Patent Application No. PCT/JP2016/051904, filed Jan. 22, 2016, which claims priority under 35 U.S.C. § 119 to Japanese Patent Application No. 2015-026206, filed Feb. 13, 2015, the entire disclosure of which is hereby expressly incorporated by reference.

TECHNICAL FIELD

The present invention relates to a fluorine-containing copolymer and a surface-modifying agent comprising the same as an active ingredient. More particularly, the present invention relates to a fluorine-containing copolymer having excellent anti-corrosive properties for metal and the like, and a surface-modifying agent comprising the same as an active ingredient.

BACKGROUND ART

Patent Document 1 discloses a releasable composition for adhesives, particularly for silicone based adhesives, the composition comprising a copolymer of a monomer mixture as an active ingredient, the monomer mixture comprising:

(1) 50 to 99.5 mass % of a polyfluoroalkyl vinyl monomer represented by the general formula:

$$C_nF_{2n+1}(CH_2CF_2)_a(CF_2CF_2)_b(CH_2CH_2)_cOCOCR{=}CH_2$$

R: a hydrogen atom or a methyl group
n: an integer of 1 to 6
a: an integer of 1 to 4
b: an integer of 0 to 3
c: an integer of 1 to 3;

(2) 0.5 to 50 mass % of an organic Si based vinyl monomer containing at least one hydrolyzable group bonded to a Si atom in the molecule; and (3) 0 to 49 mass % of a non-Si based or organic Si based vinyl monomercopolymerizable with said vinyl monomers, and not containing a hydrolyzable group bonded to a Si atom.

In this invention, the above vinyl monomer (3), which is a non-fluorine based monomer, is not an essential component (0 mass %). In addition, examples provided as the vinyl monomer (3) are alkyl (meth)acrylate, Si group-containing (meth)acrylate, aromatic vinyl monomers such as styrene, dialkyl esters of unsaturated dicarboxylic acids, maleic acid anhydride, vinyl ether, hydroxyethyl (meth)acrylate, and the like. In practice, the vinyl monomer (3) was not used in the Examples, or methyl ester, n-butyl ester and stearyl ester of methacrylic acid were used as the vinyl monomer (3) in the Examples.

When stearyl ester of methacrylic acid is used, characteristic values are provided such that, compared with when another ester is used or not used, the adhesion is equivalent, the peeling force is smaller at 25° C./one day and 70° C./one day, and the contact angle of decane is larger. However, the results of reproduction tests conducted by the present inventors revealed that although the static contact angles before and after washing with water were satisfactory, the dynamic slip angle after washing with hexadecane was not satisfactory, and additionally that anti-corrosive properties for metal were not satisfactory at all.

PRIOR ART DOCUMENTS

Patent Documents

Patent Document 1: JP-A-2012-041388
Patent Document 2: WO 2009/034773 A1
Patent Document 3: WO 2010/101091 A1

OUTLINE OF THE INVENTION

Problem to be Solved by the Invention

An object of the present invention is to provide a fluorine-containing copolymer that is a copolymer of a polyfluoroalkyl alcohol (meth)acrylate, which is used as a fluorine-containing monomer, a non-fluorine monomer, and a Si group-containing crosslinkable monomer; and to also provide a surface-modifying agent comprising the copolymer as an active ingredient, and having an excellent dynamic slip angle after washing with hexadecane and excellent anti-corrosive properties.

Means for Solving the Problem

The above object of the present invention can be achieved by a fluorine-containing copolymer that is a copolymer of:

a polyfluoroalkyl alcohol (meth)acrylate represented by the general formula:

$$C_nF_{2n+1}(CH_2CF_2)_a(CF_2CF_2)_b(CH_2CH_2)_cOCOCR{=}CH_2 \quad [I]$$

wherein R is a hydrogen atom or a methyl group, n is an integer of 1 to 6, a is an integer of 1 to 4, b is an integer of 1 to 3, and c is an integer of 1 to 3;

benzyl (meth)acrylate or styrene; and a Si group-containing crosslinkable (meth)acrylate represented by the general formula:

$$CH_2{=}CRCOO(CH_2)_dSi(OR^1)_eR^2_{3-e} \quad [II]$$

wherein R is a hydrogen atom or a methyl group, $R^1$ and $R^2$ are each an alkyl group having 1 to 10 carbon atoms, d is an integer of 1 to 3, and e is an integer of 1 to 3. The term "(meth)acrylate" used herein refers to acrylate or methacrylate.

Effect of the Invention

Compared with fluorine-containing copolymers formed using stearyl methacrylate as a non-fluorine monomer, the fluorine-containing copolymer according to the present invention and the surface-modifying agent comprising the same as an active ingredient have equivalent static contact angles before and after water washing, which means equivalent water repellency; an excellent dynamic slip angle after washing with hexadecane, which means more excellent oil repellency; and additionally excellent anti-corrosive properties for metal. Therefore, they are suitably used as surface-treating agents, particularly as water- and oil-repellents, for various substrates, particularly for metal substrates.

EMBODIMENTS FOR CARRYING OUT THE INVENTION

The polyfluoroalkyl alcohol (meth)acrylate represented by the general formula [I] is described in Patent Documents 2 and 3. Examples thereof include the following compounds

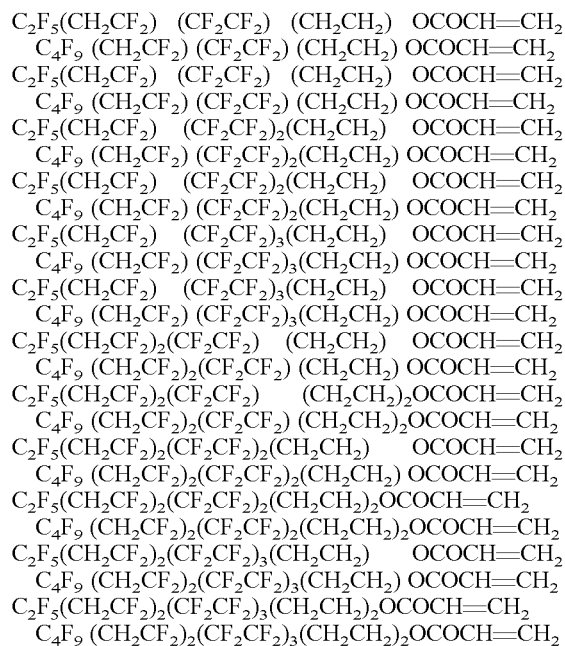

and their corresponding methacrylic acid derivatives.

As the non-fluorine monomer, benzyl acrylate, benzyl methacrylate, or styrene is used; and benzyl acrylate or benzyl methacrylate is preferably used.

Examples of the Si group-containing (meth)acrylate [II] as a crosslinkable monomer to be copolymerized with these fluorine-containing monomer and non-fluorine monomer include, for example, 3-(meth)acryloxypropyltrimethoxysilane, 3-methacryloxypropyltriethoxysilane, 3-methacryloxypropylmethyldimethoxysilane, 3-methacryloxypropylmethyldiethoxysilane, and the like. When such a crosslinkable monomer is further copolymerized, the crosslinkable group thereof is crosslinked to hydroxyl groups on the substrate surface or self-crosslinked, thereby enhancing durability, such as water- and oil-repellency. Moreover, the dynamic slip angle after washing with hexadecane can be significantly improved.

Copolymers having an increased non-fluorine monomer content are advantageous in terms of cost. In practice, the fluorine-containing monomer [I] and the non-fluorine monomer are used at a weight ratio of 1 to 99:99 to 1, preferably 50 to 95:50 to 5. The Si group-containing crosslinkable monomer [II] is used at a ratio of about 0.01 to 30 wt. %, preferably about 0.1 to 20 wt. %, in the produced copolymer.

As a fluorine atom-free monomer other than the above-mentioned non-fluorine monomers, a polyfunctional monomer or oligomer can also be copolymerized at a ratio of about 10 wt. % or less in the copolymer, if necessary. Examples of the polyfunctional monomer or oligomer include ethyleneglycol di(meth)acrylate, propyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, tetraethyleneglycol di(meth)acrylate, tripropyleneglycol di(meth)acrylate, polypropyleneglycol di(meth)acrylate, bisphenol A•ethylene oxide adduct diacrylate, dimethylol tricyclodecane diacrylate, glycerin methacrylate acrylate, or 3-acryloyloxy glycerin monomethacrylate.

In the polymerization reaction, from the viewpoint of handling convenience, the polymerization reaction is preferably performed in an organic solvent comprising at least one of fluorine-containing organic solvent such as 1,3-bis(trifluoromethyl)benzene, 1,4-bis(trifluoromethyl)benzene, 1,1,1,2,2-pentafluoro-3,3-dichloropropane, 1,1,2,2,3-pentafluoro-1,3-dichloropropane, 1,1,1,2,3,4,4,5,5,5-decafluoropentane and perfluorohexane.

As a polymerization initiator used at about 0.1 to 4 wt. %, preferably about 1 to 2 wt. %, based on the total amount of the comonomers, diacyl peroxide, peroxydicarbonate, peroxyester, or the like is used. Specific examples thereof include organic peroxides, such as isobutyryl peroxide, lauroyl peroxide, stearoyl peroxide, succinic acid peroxide, bis(heptafluorobutyryl) peroxide, pentafluorobutyroyl peroxide, bis(4-tert-butylcyclohexyl) peroxy dicarbonate, di-n-propyl peroxy dicarbonate, and diisopropyl peroxy dicarbonate. Depending on the polymerization method, an azo compound, inorganic peroxide, or a redox system thereof can also be used. Depending on the reaction conditions and the composition ratio, the polymerization reaction may hardly progress; in that case, the polymerization initiator may be added again during the polymerization reaction.

Further, a chain transfer agent can be used, if necessary, to adjust the molecular weight. Examples of chain transfer agents include dimethyl ether, methyl t-butyl ether, $C_1$-$C_6$ alkanes, methanol, ethanol, 2-propanol, cyclohexane, carbon tetrachloride, chloroform, dichloromethane, ethyl acetate, ethyl malonate, acetone, and the like.

The copolymerization reaction is performed using such a reaction solvent, a reaction initiator, etc., at a reaction temperature of about 0 to 100° C., preferably about 5 to 60° C., particularly preferably about 40 to 50° C. After completion of the reaction, a copolymer solution having a solid matters content of about 5 to 30 wt. % is obtained. The solvent is removed from this reaction mixture, thereby obtaining a fluorine-containing copolymer.

When the remaining unreacted comonomer was analyzed by gas chromatography, it was confirmed that the polyfluoroalkyl alcohol (meth)acrylic acid derivative [I] used in the copolymerization reaction was almost completely copolymerized.

The method for producing a copolymer of the polyfluoroalkyl alcohol (meth)acrylic acid derivative is not limited to the solution polymerization, and, for example, suspension polymerization, emulsion polymerization or the like using water as the dispersion medium and containing a nonionic surfactant and/or a cationic surfactant may be employed. The thus prepared copolymer of the polyfluoroalkyl alcohol (meth)acrylic acid derivative is isolated by a method of evaporation to dryness of polymerization reaction solution or aggregation by adding a flocculant such as an inorganic salt, followed by washing with a solvent or the like for purification.

The resulting copolymer is subjected to high-performance liquid chromatography method to confirm the weight average molecular weight Mw, and the value is to be about 10,000 to 1,000,000.

The polymer solution prepared by the solution polymerization is further diluted with a fluorine-containing organic solvent such as 1,4-bis(trifluoromethyl)benzene or 1,3-bis(trifluoromethyl)benzene, preferably with the same organic solvent as that used in the polymerization reaction, such that the solid matters content is about 0.01 to 30 wt %, preferably about 0.05 to 5 wt %, and is used as a surface-modifying agent. Regarding the polymerization product prepared by aqueous emulsion polymerization or suspension polymerization, an aqueous dispersion or an organic solvent solution can be prepared also using the polymerization product as an aqueous dispersion directly or after diluted with water to a solid matters content of about 0.1 to 10 wt %, or by adding a flocculant to the polymerization reaction solution for aggregating the polymerization product and dispersing in water or dissolving in a fluorine-containing organic solvent the copolymer isolated by washing the polymerization product with water or an organic solvent. The aqueous dispersion preferably containing a surfactant and a water-soluble organic solvent in a concentration of 20% or less is used. This aqueous dispersion or organic solvent solution can be used as, for example, a surface-modifying agent such as a water- and oil-repellent or an oil barrier.

The polymer solution composed of the aqueous dispersion or fluorine-containing organic solvent solution of the copolymer can further contain other additives that are necessary for the application of surface-modifying agent, for example, a cross-linking agent such as a melamine resin, an urea resin, or a blocked isocyanate; a polymer extender; another water repellent such as a silicone resin or oil, or wax; an insecticide; an antistatic agent; a dye stabilizer; a crease preventing agent; and a stain blocker.

The thus prepared surface-modifying agent can be effectively applied to, for example, metals, paper, films, fiber, fabric, woven fabric, carpet, or textile products made of filament, fiber, or yarn as a water- and oil-repellent, or effectively applied to, for example, sliding parts or parts near the sliding parts of precision instrument such as watches, motors, or lenses of digital cameras as an oil barrier for preventing exudation of lubricant oil from a sliding face to the periphery. As the method for the application, coating, dipping, spray, padding, roll coating, or a combination thereof is usually employed. For example, it is used as a pad bath by adjusting the solid matters content of a bath to about 0.1 to 10 wt %. A material to be treated is padded in the pad bath, and then the excessive liquid is removed with a squeeze roll, followed by drying such that the amount of the polymer attached to the material to be treated is about 0.01 to 10 wt %. Subsequently, the material to be treated is dried typically at about 100 to 200° C. for about 1 minute to about 2 hours to complete the surface treatment such as water- and oil-repellency treatment, though it varies depending on the type of the material to be treated.

EXAMPLES

The following describes the present invention with reference to Examples.

Example 1

$C_4F_9(CH_2CF_2)(CF_2CF_2)_2(CH_2CH_2)OCOCH=CH_2$ 84.6 g
  [fluorine-containing monomer A]
Benzyl methacrylate (Acryl Ester BZ, produced by 9.5 g
  Mitsubishi Rayon Co., Ltd.)
  [non-fluorine monomer A]
3-Acryloxypropyltrimethoxysilane 1.0 g
  (A1597, produced by Tokyo Chemical Industry Co., Ltd.)
  [crosslinking monomer A]
Bis(4-tert-butylcyclohexyl) peroxy dicarbonate mixture 1.3 g
  (Perkadox 16, produced by Kayaku Akzo Corporation)
1,3-Bis(trifluoromethyl)benzene (MTF, produced by 403.6 g Central Glass Co., Ltd.)
  [solvent A]

The above components other than the polymerization initiator were charged in a 500-ml reactor equipped with a condenser, and the inside of the reactor was replaced with nitrogen gas for 30 minutes. Then, the polymerization initiator was gradually added to the reactor (500 g in total). The internal temperature of the reactor was gradually raised to 50° C., and a polymerization reaction was performed at this temperature for 23 hours while stirring.

After completion of the reaction, the reaction product was cooled, thereby obtaining a polymer solution having a solid matters content of 19.3 wt. %. When the unreacted residual comonomers were analyzed by gas chromatography, it was confirmed that 99% or more of the fluorine-containing monomer A used in the copolymerization reaction was copolymerized.

The resulting copolymer solution was placed in an oven at 120° C., and the solvent was removed to isolate a copolymer of the fluorine-containing monomer A, the non-fluorine monomer A, and the crosslinking monomer A. The copolymerization ratio (as determined by $^{19}$F-NMR) of the copolymer was 89.0:10.0:1.0 (wt. %), and the weight average molecular weight Mw thereof was $90\times10^3$. Mw was measured using a Shodex GPC KD 806M+KD-802+KD-G by the GPC measuring method at a temperature of 40° C. and using a 10-mM tetrahydrofuran solution as an eluate at an elution rate of 1 ml/min. The detector used was a differential refractometer, and the analysis was conducted using Labchart 180, produced by System Instruments Co., Ltd. (polystyrene conversion).

By adding 1,4-bis(trifluoromethyl)benzene, the copolymer solution was diluted to a solid matters content of 2 wt. %, and 1 ml of the diluted solution was dropped and spin-coated on each glass slide (76×26 mm), followed by drying at room temperature for 12 hours or more, thereby producing test pieces.

Using the produced test pieces, the static contact angle of water, which is one indicator of water- and oil-repellency, was measured (by the sessile-drop method), and the dynamic contact angle of hexadecane $C_{16}H_{34}$ was further measured (by the sliding method). Measurements were performed before and after washing with water and washing with a 1,4-bis(trifluoromethyl)benzene solvent.

Anti-corrosive properties were measured according to JIS C 0024; 2000 (IEC 60068-2-52; 1996) in the following manner:

The resulting copolymer solution (1 ml) was dropped and spin-coated twice on each SPCC plate (50×20 mm), followed by drying at room temperature for 12 hours or more, thereby producing test pieces with a coating thickness of about 4 μm.

Similarly, by adding 1,4-bis(trifluoromethyl)benzene, the resulting copolymer solution was diluted to a solid matters content of 8 wt. %, and 1 ml of the diluted solution was dropped and spin-coated on each SPCC plate (50×20 mm), followed by drying at room temperature for 12 hours or more, thereby producing test pieces with a coating thickness of about 1 μm.

Each of the produced test pieces was tested using a combined cycle tester (produced by Suga Test Instruments Co., Ltd.) according to JIS C 0024, which is one index of an anti-corrosive test.

Test procedure (JIS C 0024)

(1) The produced test piece is placed in the tank of the composed cycle tester, and a sodium chloride aqueous solution prepared to 5 wt. % is sprayed at a temperature in the range from 15 to 35° C. for 2 hours.

(2) After Step (1), the test piece is allowed to stand in an atmosphere at a temperature of 40° C. and a relative humidity of 93% for 20 to 22 hours.

(3) Steps (1) and (2) are repeated 4 times.

(4) After Step (3), the test piece is allowed to stand in an atmosphere at 23° C. and a relative humidity of 45% to 55% for 3 days.

(5) Steps (1) to (4) are regarded as one test cycle. Three test cycles are called "severity 3," and four test cycles are called "severity 4."

(6) Evaluation is performed by visually confirming the presence of corrosion on the metal surface, and the results are evaluated as follows:
⊚: Severity 4 is cleared
○: Severity 3 is cleared
x: Severity 3 is not cleared
(no or poor anti-corrosive effect)

Examples 2 and 3

In Example 1, the amount of each monomer was changed as shown in Table 1. The amount of the polymerization initiator used in each Example was 1.3 g.

Examples 4 to 8

In Example 1, 3-methacryloxypropyltrimethoxysilane (crosslinking monomer B; M0725, produced by Tokyo Chemical Industry Co., Ltd.) was used in place of the crosslinking monomer A, and the amount of each monomer was changed as shown in Table 1. The amount of the polymerization initiator used in each Example was 1.3 g.

Example 9

In Example 4, the same amount (403.6 g) of 1,4-bis (trifluoromethyl)benzene (solvent B; PTF, produced by Central Glass Co., Ltd.) was used in place of the solvent A.

Example 10

In Example 4, the same amount (403.6 g) of ethyl nonafluoroether (solvent C; 7200/3M, produced by Novec) was used in place of the solvent A.

Example 11

In Example 4, the same amount (403.6 g) of an equivalent weight mixture of solvent B and solvent C was used in place of the solvent A.

TABLE 1

(copolymerization reaction)

| Example | fluorine-containing monomer A (g) | non-fluorine monomer A (g) | crosslinking monomer (g) A | crosslinking monomer (g) B | copolymer solution solid matters content (%) | Mw (×10³) |
|---|---|---|---|---|---|---|
| 1 | 84.6 | 9.5 | 1.0 | — | 19.3 | 90 |
| 2 | 84.3 | 9.4 | 2.9 | — | 19.6 | 87 |
| 3 | 84.0 | 9.4 | 4.9 | — | 19.9 | 85 |
| 4 | 84.6 | 9.5 | — | 1.0 | 19.3 | 91 |
| 5 | 84.3 | 9.4 | — | 2.9 | 19.6 | 90 |
| 6 | 84.0 | 9.4 | — | 4.9 | 19.9 | 90 |
| 7 | 75.3 | 18.8 | — | 1.0 | 19.3 | 85 |
| 8 | 56.4 | 37.7 | — | 1.0 | 19.3 | 85 |
| 9 | 84.6 | 9.5 | — | 1.0 | 19.3 | 90 |
| 10 | 84.6 | 9.5 | — | 1.0 | 19.3 | 89 |
| 11 | 84.6 | 9.5 | — | 1.0 | 19.3 | 90 |

TABLE 2

(produced copolymer)

| Example | fluorine-containing monomer A (wt. %) | non-fluorine monomer A (wt. %) | crosslinking monomer (wt. %) A | crosslinking monomer (wt. %) B |
|---|---|---|---|---|
| 1 | 89.0 | 10.0 | 1.0 | — |
| 2 | 87.2 | 9.8 | 3.0 | — |
| 3 | 85.4 | 9.6 | 5.0 | — |
| 4 | 89.0 | 10.0 | — | 1.0 |
| 5 | 87.2 | 9.8 | — | 3.0 |
| 6 | 85.4 | 9.6 | — | 5.0 |
| 7 | 79.2 | 19.8 | — | 1.0 |
| 8 | 59.4 | 39.6 | — | 1.0 |
| 9 | 89.0 | 10.0 | — | 1.0 |
| 10 | 89.0 | 10.0 | — | 1.0 |
| 11 | 89.0 | 10.0 | — | 1.0 |

TABLE 3

(performance evaluation)

| Example | static contact angle (water, °) before washing | static contact angle (water, °) after washing | dynamic slip angle ($C_{16}H_{34}$, °) before washing | dynamic slip angle ($C_{16}H_{34}$, °) after washing | anti-corrosive properties coating thickness of 1 μm | anti-corrosive properties coating thickness of 4 μm |
|---|---|---|---|---|---|---|
| 1 | 119 | 119 | 4 | 4 | ○ | ⊚ |
| 2 | 120 | 118 | 4 | 5 | ○ | ⊚ |
| 3 | 119 | 119 | 4 | 5 | ○ | ⊚ |
| 4 | 119 | 117 | 4 | 5 | ○ | ⊚ |
| 5 | 120 | 118 | 4 | 5 | ○ | ⊚ |
| 6 | 119 | 117 | 4 | 5 | ○ | ⊚ |
| 7 | 119 | 117 | 4 | 4 | ○ | ⊚ |
| 8 | 119 | 115 | 4 | 5 | ○ | ⊚ |
| 9 | 118 | 117 | 4 | 5 | ○ | ⊚ |
| 10 | 119 | 117 | 4 | 5 | ○ | ⊚ |
| 11 | 118 | 117 | 5 | 5 | ○ | ⊚ |
| 12 | 119 | 118 | 5 | 8 | ○ | ⊚ |
| 13 | 118 | 116 | 5 | 5 | ○ | ⊚ |

Example 12

In Example 4, the same amount (84.6 g) of a fluorine-containing monomer B:
$C_4F_9(CH_2CF_2)(CF_2CF_2)_2(CH_2CH_2)OCOC$
$(CH_3)=CH_2$ was used in place of the fluorine-containing monomer A. The solid matters content of the resulting copolymer solution was 19.3 wt. %, the copolymerization ratio of a copolymer of the fluorine-containing monomer B, the non-fluorine monomer A, and the crosslinking monomer A was 89.0:10.0:1.0 (wt. %), and the weight average molecular weight Mw thereof was $90 \times 10^3$.

Example 13

In Example 4, the same amount styrene (produced by Wako Pure Chemical Industries, Ltd.) was used as a non-fluorine monomer B in place of the non-fluorine monomer A. The solid matters content of the resulting copolymer solution was 19.3 wt. %, the copolymerization ratio of a copolymer of the fluorine-containing monomer A, the non-fluorine monomer B, and the crosslinking monomer B was 89.0:10.0:1.0 (wt. %), and the weight average molecular weight Mw thereof was $89 \times 10^3$.

Table 3 also shows the performance evaluation of the copolymers obtained in Examples 12 and 13.

Comparative Examples 1 to 5

In Example 1, stearyl methacrylate (Light Ester S, produced by Kyoeisha Chemical Co., Ltd.) was used as a non-fluorine monomer C in place of the non-fluorine monomer A, and the amount of each monomer was changed as shown in Table 4. The amount of the polymerization initiator used in each Comparative Example was 3.0 g.

TABLE 4

(copolymerization reaction)

| Com. Ex. | fluorine-containing monomer A (g) | non-fluorine monomer C (g) | crosslinking monomer (g) A | crosslinking monomer (g) B | copolymer solution solid matters content (%) | Mw (×10³) |
|---|---|---|---|---|---|---|
| 1 | 74.8 | 8.8 | 0.9 | — | 17.5 | 91 |
| 2 | 74.5 | 8.7 | 2.6 | — | 17.8 | 90 |
| 3 | 74.3 | 8.7 | 4.4 | — | 18.1 | 90 |
| 4 | 74.3 | 8.7 | — | 4.4 | 18.1 | 91 |
| 5 | 74.9 | 8.8 | — | — | 17.3 | 95 |

TABLE 5

(produced copolymer)

| Com. Ex. | fluorine-containing monomer A (wt. %) | non-fluorine monomer C (wt. %) | crosslinking monomer (wt. %) A | crosslinking monomer (wt. %) B |
|---|---|---|---|---|
| 1 | 88.6 | 10.4 | 1.0 | — |
| 2 | 86.8 | 10.2 | 3.0 | — |
| 3 | 85.0 | 10.0 | 5.0 | — |
| 4 | 85.0 | 10.0 | — | 5.0 |
| 5 | 89.5 | 10.5 | — | — |

TABLE 6

(performance evaluation)

| Com. Ex. | static contact angle (water, °) before washing | static contact angle (water, °) after washing | dynamic slip angle ($C_{16}H_{34}$, °) before washing | dynamic slip angle ($C_{16}H_{34}$, °) after washing | anti-corrosive properties coating thickness of 1 μm | anti-corrosive properties coating thickness of 4 μm |
|---|---|---|---|---|---|---|
| 1 | 119 | 118 | 5 | 9 | X | X |
| 2 | 118 | 116 | 5 | 9 | X | X |
| 3 | 118 | 119 | 5 | 7 | X | X |
| 4 | 119 | 117 | 5 | 8 | X | X |
| 5 | 118 | 104 | 8 | 24 | X | X |

Comparative Example 6

In Example 1, a copolymerization reaction was carried out using 84.8 g of the fluorine-containing monomer A, 9.5 g of the non-fluorine monomer A, and 1.3 g of the polymerization initiator, and any crosslinking monomer was not used. The solid matters content of the resulting copolymer solution was 19.1 wt. %, the copolymerization ratio of a copolymer of the fluorine-containing monomer A and the non-fluorine monomer A was 89.9:10.1 (wt. %), and the weight average molecular weight Mw thereof was $90 \times 10^3$.

Comparative Example 7

In Example 1, 84.6 g of 2-(n-perfluorohexyl)ethyl acrylate (fluorine-containing monomer C) in place of the fluorine-containing monomer A, the same amount (9.5 g) of non-fluorine monomer A, the same amount (1.3 g) of polymerization initiator, and 1.0 g of the crosslinking monomer B in place of the crosslinking monomer A were used, respectively. The solid matters content of the resulting copolymer solution was 19.3 wt. %, the copolymerization ratio of a copolymer of the fluorine-containing monomer C, the non-fluorine monomer A and the crosslinking monomer B was 89.0:10.0:1.0 (wt. %), and the weight average molecular weight Mw thereof was $87 \times 10^3$.

Reference Example

In Example 1, 84.6 g of 2-(n-perfluorooctyl)ethyl acrylate (fluorine-containing monomer D) in place of the fluorine-containing monomer A, the same amount (9.5 g) of non-fluorine monomer A, the same amount (1.3 g) of polymerization initiator, and 1.0 g of the crosslinking monomer B in place of the crosslinking monomer A were used, respectively. The solid matters content of the resulting copolymer solution was 19.3 wt. %, the copolymerization ratio of a copolymer of the fluorine-containing monomer D, the non-fluorine monomer A and the crosslinking monomer B was 89.0:10.0:1.0 (wt. %), and the weight average molecular weight Mw thereof was $89 \times 10^3$.

TABLE 7

(copolymerization reaction)

| Com. Ex. | fluorine-containing monomer (g) A | fluorine-containing monomer (g) C | fluorine-containing monomer (g) D | non-fluorine monomer A (g) | crosslinking monomer B (g) | copolymer solution solid matters content (%) | Mw (×10³) |
|---|---|---|---|---|---|---|---|
| 6 | 84.8 | — | — | 9.5 | — | 19.1 | 90 |
| 7 | — | 84.6 | — | 9.5 | 1.0 | 19.3 | 87 |
| Ref. Ex. | — | — | 84.6 | 9.5 | 1.0 | 19.3 | 89 |

TABLE 8

(produced copolymer)

| Com. Ex. | fluorine-containing monomer (wt. %) A | fluorine-containing monomer (wt. %) C | fluorine-containing monomer (wt. %) D | non-fluorine monomer A (wt. %) | crosslinking monomer B (wt. %) |
|---|---|---|---|---|---|
| 6 | 89.9 | — | — | 10.1 | — |
| 7 | — | 89.0 | — | 10.0 | 1.0 |
| Ref. Ex. | — | — | 89.0 | 10.0 | 1.0 |

TABLE 9

(performance evaluation)

| Com. Ex. | static contact angle (water, °) | | dynamic slip angle ($C_{16}H_{34}$, °) | | anti-corrosive properties | |
|---|---|---|---|---|---|---|
| | before washing | after washing | before washing | after washing | coating thickness of 1 μm | coating thickness of 4 μm |
| 6 | 119 | 103 | 5 | 22 | ○ | ◉ |
| 7 | 115 | 112 | 8 | 9 | ○ | ◉ |
| Ref. Ex. | 120 | 118 | 4 | 5 | ○ | ◉ |

The invention claimed is:

1. An anti-corrosive agent comprising a fluorine-containing copolymer as an active ingredient, the fluorine-containing polymer being a copolymer of:

a polyfluoroalkyl alcohol (meth)acrylate represented by the general formula:

$$C_nF_{2n+1}(CH_2CF_2)_a(CF_2CF_2)_b(CH_2CH_2)_cOCOCR{=}CH_2 \quad [I]$$

wherein R is a hydrogen atom or a methyl group, n is an integer of 1 to 6, a is an integer of 1 to 4, b is an integer of 1 to 3, and c is an integer of 1 to 3;

benzyl (meth)acrylate; and a Si group-containing crosslinkable (meth)acrylate represented by the general formula:

$$CH_2{=}CRCOO(CH_2)_dSi(OR^1)_eR^2_{3-e} \quad [II]$$

wherein R is a hydrogen atom or a methyl group, $R^1$ and $R^2$ are each an alkyl group having 1 to 10 carbon atoms, d is an integer of 1 to 3, and e is an integer of 1 to 3.

2. The anti-corrosive agent comprising a fluorine-containing copolymer according to claim 1, wherein the copolymer has a weight average molecular weight Mw of 10,000 to 1,000,000.

3. The anti-corrosive agent comprising a fluorine-containing copolymer according to claim 1, wherein the fluorine-containing monomer [I] and the benzyl (meth)acrylate are copolymerized at a weight ratio of 1 to 99:99 to 1.

4. The anti-corrosive agent comprising a fluorine-containing copolymer according to claim 1, wherein the fluorine-containing monomer [I] and the benzyl (meth)acrylate are copolymerized at a weight ratio of 50 to 95:50 to 5.

5. The anti-corrosive agent comprising a fluorine-containing copolymer according to claim 1, wherein the Si group-containing crosslinkable monomer [II] is copolymerized at a ratio of 0.01 to 30 wt. % in the fluorine-containing copolymer.

6. The anti-corrosive agent according to claim 1, wherein the agent is prepared as an organic solvent solution.

7. The anti-corrosive agent according to claim 6, wherein the agent is prepared as a fluorine-containing organic solvent solution.

8. The anti-corrosive agent according to claim 1, wherein the agent is used for a metal substrate.

* * * * *